(12) United States Patent
Ziemann et al.

(10) Patent No.: US 9,244,954 B2
(45) Date of Patent: *Jan. 26, 2016

(54) CUSTOMIZING STANDARD FORMULA FIELDS IN A MULTI-TENANT DATABASE SYSTEM ENVIRONMENT

(71) Applicant: salesforce.com, inc., San Francisco, CA (US)

(72) Inventors: Tyler Ziemann, San Francisco, CA (US); Susan S. Levine, Walnut Creek, CA (US); Neeraj Ahuja, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/485,329

(22) Filed: Sep. 12, 2014

(65) Prior Publication Data
US 2015/0006590 A1    Jan. 1, 2015

Related U.S. Application Data

(63) Continuation of application No. 12/985,316, filed on Jan. 5, 2011, now Pat. No. 8,862,632.

(60) Provisional application No. 61/349,706, filed on May 28, 2010.

(51) Int. Cl.
*G06F 7/00* (2006.01)
*G06F 17/30* (2006.01)

(52) U.S. Cl.
CPC .... *G06F 17/30292* (2013.01); *G06F 17/30551* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |

(Continued)

*Primary Examiner* — Uyen Le

(74) *Attorney, Agent, or Firm* — Ingrassia Fisher & Lorenz, P.C.

(57) ABSTRACT

In a method, system, and computer-readable medium having instructions for customizing standard formula fields, at least a portion of a formula is received for a standard database field of a standard database entity in a multi-tenant database and the standard database entity is used by a plurality of tenants, a date range is stored for maintaining at least the portion of the formula, information on one or more variables of the formula is received, a value is calculated for the standard database field with at least the portion of the formula and information on the one or more variables of the formula and one or more database entities depend on the value for the standard database field, and the value is stored for the standard database field.

20 Claims, 6 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |

CUSTOMIZING STANDARD FORMULA FIELDS IN A MULTI-TENANT DATABASE SYSTEM ENVIRONMENT

CROSS-REFERENCE TO RELATED APPLICATIONS

This application is a continuation of U.S. patent application Ser. No. 12/985,316, filed Jan. 5, 2011 and issued as U.S. Pat. No. 8,862,632 on Oct. 14, 2014, which claims the benefit of U.S. Provisional Patent Application 61/349,706 entitled "METHODS AND SYSTEMS FOR CUSTOMIZING QUOTE INFORMATION IN A MULTI-TENANT DATABASE SYSTEM ENVIRONMENT" by Ziemann et al., filed May 28, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to customizing standard formula fields in a database system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request on a webpage. The efficient retrieval of accurate information and subsequent delivery of this information to the user system in a manner that is easy to understand has been and continues to be a goal of administrators of database systems.

Unfortunately, conventional database approaches might become inefficient if, for example, changes to formulas defined are not handled properly. A database system may also process a query relatively slowly if, for example, a relatively large number of users substantially concurrently change values for calculated values in the database system.

Accordingly, it is desirable to provide techniques enabling customization formulas of the database system to improve accurate retrieval of information from the database system.

BRIEF SUMMARY

In accordance with embodiments, there are provided mechanisms and methods for customizing standard formula fields.

In a method, system, and computer-readable medium having instructions for customizing standard formula fields, at least a portion of a formula is received for a standard database field of a standard database entity in a multi-tenant database and the standard database entity is used by a plurality of tenants, a date range is stored for maintaining at least the portion of the formula, information on one or more variables of the formula is received, a value is calculated for the standard database field with at least the portion of the formula and information on the one or more variables of the formula and one or more database entities depend on the value for the standard database field, and the value is stored for the standard database field.

While one or more implementations and techniques are described with reference to an embodiment in which customizing standard formula fields is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

General Overview

Figure 1:
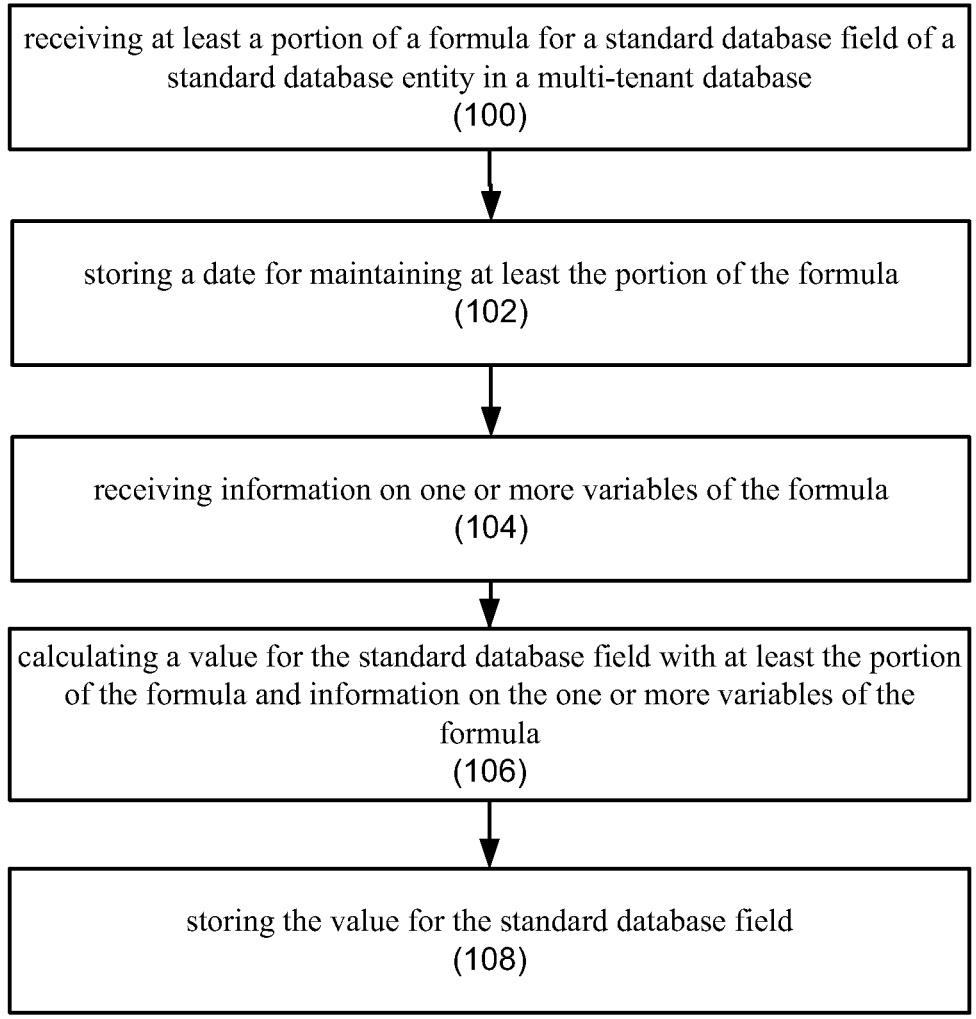
FIG. 1 illustrates an example of a simplified flow diagram for an implementation of customizing standard formula fields in a database system.

Systems and methods are provided for customizing standard formula fields in a multi-tenant database system environment. It may be desirable to provide a declarative way for a user to modify or provide a custom formula for a standard database field of a multi-tenant database system. In one or more embodiments, at least a portion of a formula is provided by a user to modify or customize a formula for a standard database field. With a multi-tenant system, data for multiple tenants may be stored in the same physical database table and/or field, however, tenant data typically is arranged so that data of one tenant is kept logically separate from that of other tenants. A standard database field is a database field of a standard database entity that is part of the physical space shared by a plurality of tenants in the multi-tenant database.

In a relational database, a database entity may have one or more database table(s) or be a database view. In an object database, the entity may map to an object class. The database table may be represented with columns that are fields for the database table and rows that represent the records of the database table. Each row or record in the database table may have one or more values for the database fields of the database table. Although examples provided throughout may refer to an entity as a database table, those skilled in the art will recognize that there are various ways an entity of a database design may be implemented.

In some multi-tenant database systems, standard entity tables might be provided for use by all tenants. For Customer Relationship Management (CRM) database applications, such standard entities might include tables for Account, Contact, Lead, Quote, and Opportunity data, each containing predefined standard database fields. In one or more embodiment, a standard database field may have a stored derived or calculated value governed and/or defined by a standard formula. The standard formula may be applied to calculate or derive a value for a standard database field for tenants. For example, a standard database field for a total price may be defined for all tenants as:

Total Price=Price*Quantity*(1−Discount), where "Discount" is provided as a percentage (e.g. 20%). A standard database field that has a stored or calculated value is calculated prior to storage in the database after receiving input of the variables necessary to calculate the standard formula for the standard database field. For example, when the input is received for an opportunity for a sale of a product and the user inputs or causes the input of a quantity, a price, and a discount, then the total price may be calculated and stored in the database. In an embodiment, the standard database field that has a stored value may be retrieved from the database and may not need to be calculated on-the-fly or at runtime when a webpage requests the values for display. For example, a database field defined by a formula may have a great number of dependencies such that storage of the calculated value for the database field may be more efficient than calculation of the value on-the-fly.

Embodiments may provide a way for a user to modify a formula or provide their own formula for the standard database field. The standard database field may have many other database entities, database fields and/or database tables that depend on the value of the standard database field. By way of example, in a CRM application, the "total price" for an opportunity of a sale may impact the forecasting, the shipping of goods, revenue calculations, quote generation, and their respective tables in the database.

In one or more embodiments, a date and/or date range is provided for maintaining the customized formula for the standard database field over time. It may be desirable to calculate the standard database field value with the formula as expected for the date of entry of the database field. For example, the database field "total price" of an "Opportunity" database entity should be calculated with the formula that was valid for the tenant at the time of entry of the "Opportunity." Continuing with the example, if the "Opportunity" is deleted or temporarily marked deleted and the user chooses to keep the "Opportunity" such that the data row must be reentered or input to the database, then the standard database field should be calculated with the formula at the time of the original entry.

A consistent application of the formula for the standard database field may be maintained in order to ensure that functionality of dependencies on the standard database field is not disrupted. Although consistent application of the formula for the standard database field is described throughout as based upon date, those with skill in the art will recognize other methods for consistent application of a formula to ensure that a disruption in functionality to dependencies is limited. In other embodiments, a list of dependencies for a particular database field may be kept and changes to the dependencies or the standard database field may be made as needed to limit or avoid disruption.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms, systems, computer readable mediums and methods for providing customized standard formula fields in a multi-tenant database system environment will be described with reference to example embodiments. FIG. 1 illustrates an example of a simplified flow diagram for an implementation of customizing standard formula fields in a database network system. At least a portion of a formula for a standard database field of a standard database entity in a multi-tenant database is received (100). A standard database field of a standard database entity is a database entity with a database field that is predefined and may be used by a plurality of tenants. The standard database field may be predefined with a standard or default formula. In an embodiment, the standard database field may be defined by a hard coded formula (e.g. in the source code) and the database field value may be calculated at the time of storage. For example, the standard database field may be calculated by the database upon receipt of a request to the database to insert the database field, such as with a Standard Query Language (SQL) insertion query request that has the formula hard-coded within the query request.

The tenants may share the same logical storage for the database entity and may have a different physical storage space for the database entity. The standard database field may be predefined by a standard formula for all tenants and the value calculated for the standard formula may be stored in the database field. In an embodiment, the value for the database field may be stored when the variables for the formula are input by the user. The standard database field may be viewed as a stored derived or calculated field that is stored in the database and may not be calculated on-the-fly or at runtime.

In a preferred embodiment, the standard database field is a "Total Price" database field of an "Opportunity" database entity or "Quote" database entity in a CRM application. A "Quote" database entity may be viewed as a child and dependency of an "Opportunity" database entity. For example, the "Quote" may depend on a "Total Price" database field calculated and stored with the "Opportunity."

The portion of the formula for a standard database field may be a formula for a portion of the formula, such as a variable of a standard formula and/or a formula to replace a standard formula. The portion of the formula for the standard database field may modify or replace the standard formula to customize the formula for a tenant, a product, or any other modification desired by the user. For example, with a standard predefined formula Total Price=Price*Quantity*(1−Discount), where a "Discount" is a percentage, the "Discount" may be replaced with an amount in a particular currency. Continuing with the example, the "Discount" may be input as a particular dollar amount and a flag may be set to indicate that a percentage may not be used for the "Discount."

In another example, the "Price" may be replaced with a portion of a formula "Price−Unit Cost", where "Unit Cost" is a cost for a product. Continuing with the example, by altering the formula to subtract "Unit Cost", dependencies such that perform forecasting may be able to forecast off of a "Total Price" that may be closer to gross profit.

A date for maintaining at least the portion of the formula may be stored (102). A date and/or date range may be stored with the portion of the formula to ensure the formula is consistently calculated with the appropriate formula for the date of entry of the particular data row and/or standard database field in the standard database entity. The date or date range may indicate the start and/or expiration of a particular formula for a standard database field. For example, forecasting may be dependent on the "Total Price" database field calculated for an "Opportunity" or a "Quote" and the formula may need to be consistently applied for the date range for which the formula is valid. Continuing with the example, if a soft delete is performed on a data row (e.g. a temporary deletion of a database data row) and the user decides to keep the data row for the "Opportunity," then the formula calculated for the database field on the date that the data row was input may need to be used for the data row that has not been kept. This may ensure that the data relied on for forecasting or any dependency on the standard database field uses the same formula for the calculated standard database field on any given day. Dependencies may include, but are not limited to, forecasting, schedules for delivery, handling of unit price changes, revenue schedules, and any other dependencies in a CRM system.

The information on one or more variable of the formula may be received (104). The user may input the variables using a user interface. For example, the user may input the values for an opportunity to sell a product with information on a "Product," a "Price," and a "Quantity." The "Product," "Price," and "Quantity" may be variables for the "Total Price" calculation for the standard database field. When the user inputs the variables within the user interface, the variables may be stored in a database row for the particular "Opportunity."

The value for the standard database field may be calculated with at least the portion of the formula and information on the one or more variables of the formula (106). One or more database entities may depend on the value for the standard database field and the formula for the date of initial entry of the standard database field may need to be retrieved. The formula for the standard database field may be retrieved for the particular date that the user inputs the information the variable information. For example, a Metadata table for an "Opportunity" may store the formula information for a standard database field of the "Opportunity" and the expiration of the formula for the "Opportunity" database field. Although particular examples and implementations are provided throughout for modifying or replacing a formula with a Metadata database table for a database entity, those with skill in the art will recognize that there are many ways to indicate that a formula has been modified.

In another example, the formula may have been updated and given a date range that overrides previous formulas. For example, if a formula was replaced and a date range was provided that changes the formula for past calculations of the standard database field, then the calculations may need to be updated. A batch process may run to perform the revision of calculations without manual intervention and when computing resources are less busy. In another example, the user may be prevented from changing past calculations for a standard database field.

The value for the standard database field may be stored (108). The calculated value for the standard database field may be calculated and stored in the database with a date that the database field was calculated. The date for entry of the database field and/or data row may aid in ensuring that the appropriate formula is applied if recalculation is necessary for the database field. It may be desirable to ensure that a formula is consistently applied to the data for a particular day or date range. For example, forecasting may depend on the values of the "Total Price" and calculate a sum for the "Total Price" of all "Opportunities" and/or "Quotes" for a particular day. Continuing with the example, the consistent application of the formula may need to be applied for the day in order for the forecasting to be accurate.

Those with skill recognize that there are many options for when to calculate a value for the standard database field. In an embodiment, the value may be calculated upon initialization of a database object for a particular standard entity. A database object may represent the data in one or more database tables for a particular database entity (e.g. a Quote entity). The database object is an encapsulation of the data within database tables and related database tables for an entity. The database object may have functions or methods to access the underlying data values for a particular instance of the database object. Database fields of one or more database tables for a database entity may be mapped to the data attributes encapsulated in the database object. In an embodiment, the database fields for a data row of a database table for an entity may map to the attributes of a database object. As used herein, "database object" may be construed broadly to be metadata about database fields and data from database fields from database tables and related database tables for a database entity.

In another embodiment, the standard database field may be calculated with a modified formula using a "pretrigger" that modifies the value before storing the database value in the database. In another embodiment, the value of a standard database field may be recalculated with the modified formula after it has been saved to the database and the new value may be calculated and resaved, such as with a "post-trigger". In another embodiment, a workflow may change the standard database field with the modified formula in response to a defined triggering action, such as an e-mail or a trigger for batch processing.

In an embodiment, a Salesforce™ workflow may be defined to automate a business process. Business processes may include, but are not limited to, emailing an alert, updating a data field, automating a quote to order process, or any other business process. The workflow may be viewed as an action which is triggered by inserting and/or changing a data record. For example, a workflow can trigger a task, an email alert, update a data field, and/or send a message. Workflow rules may specify the criterion which determines if a workflow is triggered. The workflow may be triggered immediately and/or be set to operate with a time interval following a triggering event. In an embodiment, outbound messages may be sent to move information from a Force.com™ environment to an external data store and/or application. In another embodiment, a workflow may route information to a series of people, each of whom can approve the information, sending it on to the next recipient, or declining the approval.

Figure 2:
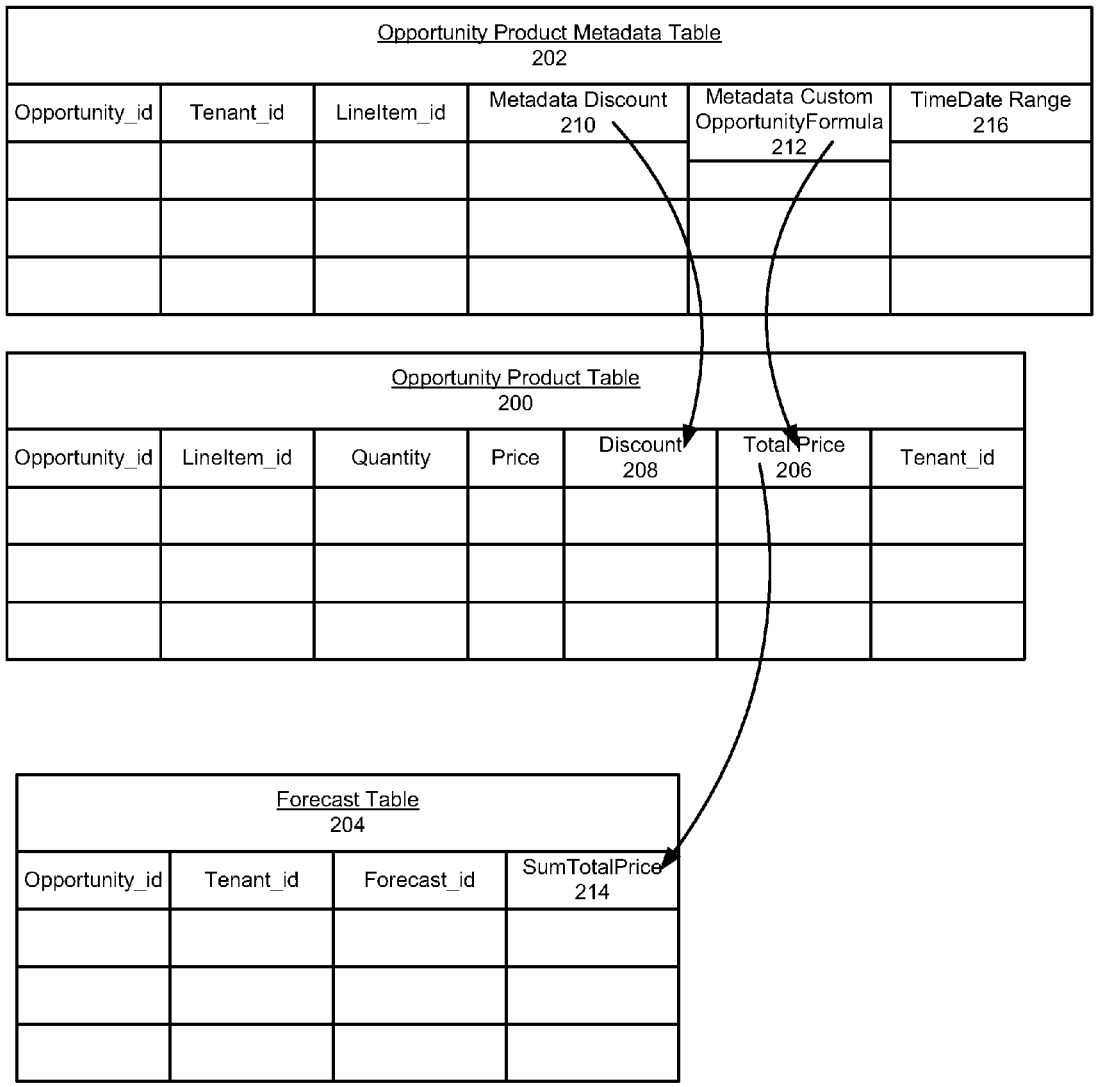
FIG. 2 illustrates an example of an implementation of entities for using an embodiment of customizing standard formula fields in a database system.

FIG. 2 illustrates an example of an implementation of entities for using an embodiment of customizing standard formula fields in a database system. In FIG. 2, the database table Opportunity Product Table 200 is an example of a table for a standard entity in a CRM application. The Opportunity Product Table 200 has database fields, as follows: Opportunity_id, LineItem_id, Quantity, Price, Discount 208, TotalPrice 206, and Tenant_id. The "Opportunity_id" is the primary key for the Opportunity Product Table 200 and indicates an opportunity for a tenant with a tenant primary key specified in "Tenant_id" of a multi-tenant database. Each row of the Opportunity Product Table 200 may specify a standard database entity of an "Opportunity" for a tenant. The data row for the opportunity may specify the product with a "LineItem_id" for the opportunity, and one or more variables (e.g. the quantity, the price, and discount) to calculate the stored standard database field, TotalPrice 206. The TotalPrice 206 may have a standard default formula to define and calculate the TotalPrice 206 database field.

The user may modify the formula for the standard database field with at least a portion of a formula stored in the Opportunity Product Metadata Table 202. The user may indicate a portion of the formula by modifying the value or definition of the Discount 208 with Metadata Discount 210 in the Opportunity Product Metadata Table 202. For example, a percentage discount definition (e.g. 20% of Price*Quantity) for the variable may be overridden with a particular dollar amount. In another example, the user may modify the standard formula with a replacement for the formula used to calculate the standard database field TotalPrice 206 with a formula stored in Metadata Custom Opportunity Formula 212.

The Forecast Table 204 may depend on the value of the TotalPrice 206 to calculate the SumTotalPrice 214. In an embodiment, the same formula is used for TotalPrice 206 for a particular date when calculating the SumTotalPrice 214 of forecasting. The TimeDateRange 216 may provide a date range for the validity of the portion of the formula defined in the Opportunity Product Metadata Table 202.

In one or more embodiments, limitations may be placed on the formulas input by the user and/or custom code that may be executed by the user. For example, custom code that references itself and may cause an infinite loop may be forbidden. Continuing with the example, if a user has a workflow or custom code that replaces the discount value to a user defined value if the discount has a value over a certain amount and upon entry of the user defined value for the discount, a trigger changes the value to a value over the certain amount, then an infinite loop may occur.

Figure 3:
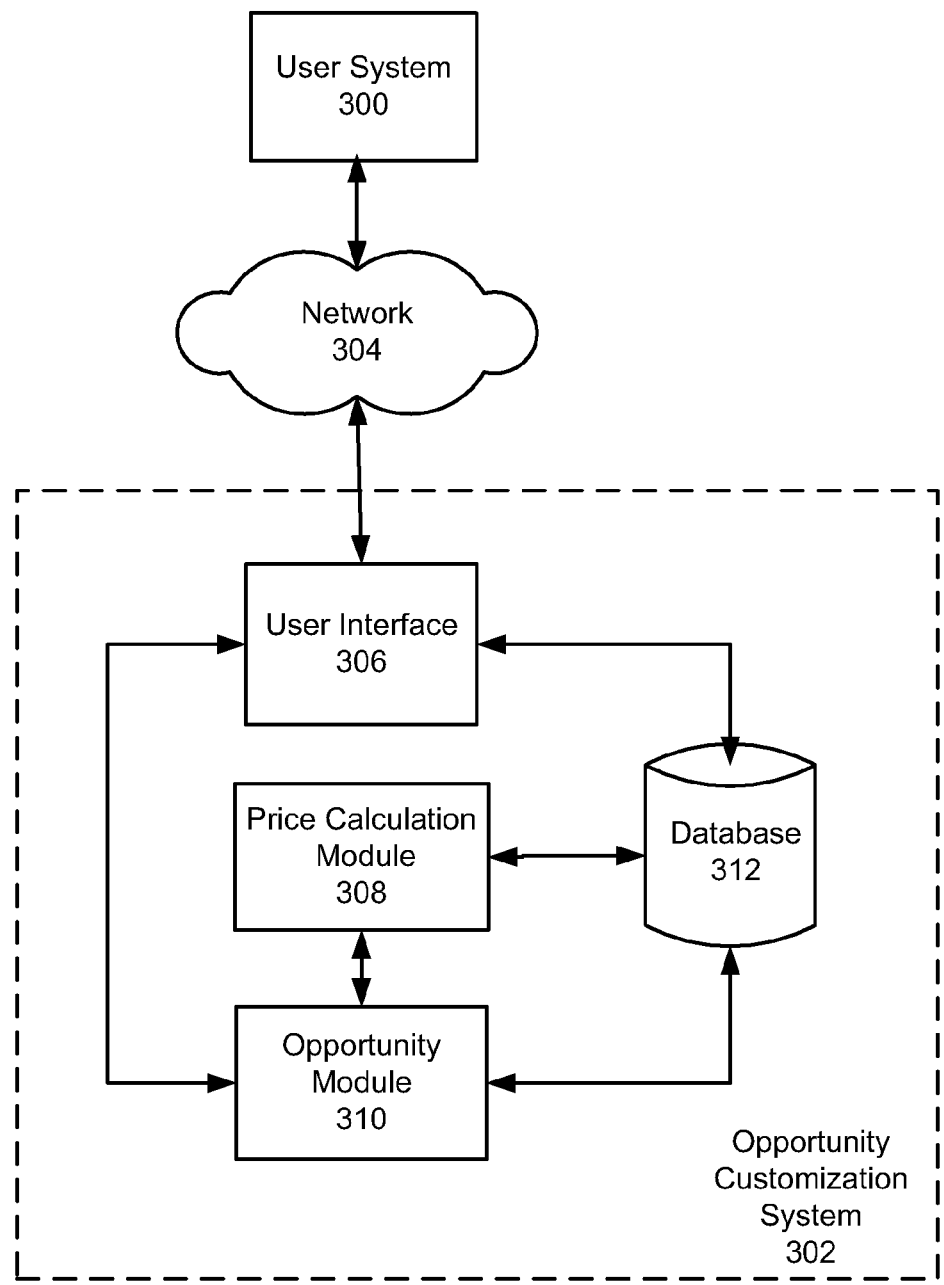
FIG. 3 illustrates an example of a block diagram for an implementation of customizing standard formula fields in a database system.

FIG. 3 illustrates an example of a block diagram for an implementation of customizing standard formula fields in a database system. In FIG. 3, User System 300 interacts with an Opportunity Customization System 302 according to an embodiment. As will be appreciated by those skilled in the art, the functional elements of the Opportunity Customization System 302 as illustrated in FIG. 3 are provided as an example, and various implementations of the system may have subsets of the functional elements and/or subsets may be distributed among various computer systems. In one or more embodiments, the Opportunity Customization System 302 may be a server servicing requests sent by a user using the User System 300 over the Network 304. In another embodiment, the Opportunity Customization System 302 may be a stand-alone application on a computer system.

A User System 300 may include, but is not limited to, a mobile device, a smart phone, an Apple iPhone™, a cellular phone, a BlackBerry® device, a personal digital assistant (PDA), a mp3 player, a laptop, a computer, a telephone, User System 712 described below, or any other type of computer system. A Network 304 is an infrastructure for sending and receiving signals and messages according to one or more formats, standards, or protocols. The Network 304 may provide for both wired and wireless communication between the various elements of FIG. 3. Embodiments may rely on a Network 304 for communication between elements as depicted, including, but not limited to, the following: User Interface 306, Price Calculation Module 308, Opportunity Module 310, and Database 312.

As illustrated in FIG. 3, a user may interact with the using the User Interface 306. In one or more embodiments, the User Interface 306 may be a webpage that can be accessed through a web browser on the User System 300 and provided on the display of the User System 300. In one or more embodiments, the User Interface 306 may be a part of UI 830 accessible from an Application Server 800, described in further detail below with FIG. 6. The user may utilize the User Interface 306 to input at least a portion of a formula for a standard database field and one or more variables to calculate the standard database field. The inputted portion of the formula may be stored in the Database 312 for retrieval, and the standard database field may be calculated and stored in the Database 312.

A database is any collection of data that may be stored and queried for retrieval of the stored data. Implementations of a database include, but are not limited to, relational databases, object-oriented databases, and file systems. The Database 312 may have a database server or a database management system for receiving requests and sending responses to requests for the database, such as query requests. In some embodiments, a query language may be used to query the database and produce a query result. For example, the query language SQL may be used to query a database and produce a query result set. In another embodiment, the data may be stored in a file system and a command may be executed to find or search the data within the file system. In a preferred embodiment, the Database 312 is a multi-tenant database.

A request may be received for input of information for a Quote and/or Opportunity database entity using the User Interface 306, including one or more variables for calculating a "Total Price" standard database field. An Opportunity Module 310 may utilize a Price Calculation Module 308 to retrieve the relevant formula for a "Total Price" standard database field. The relevant formula may be retrieved from the Database 312 for a particular product, tenant, within a particular date range, or any other criteria. The Price Calculation Module 308 may calculate the "Total Price" with the relevant formula and store the calculated value in the Database 312.

Figure 4:
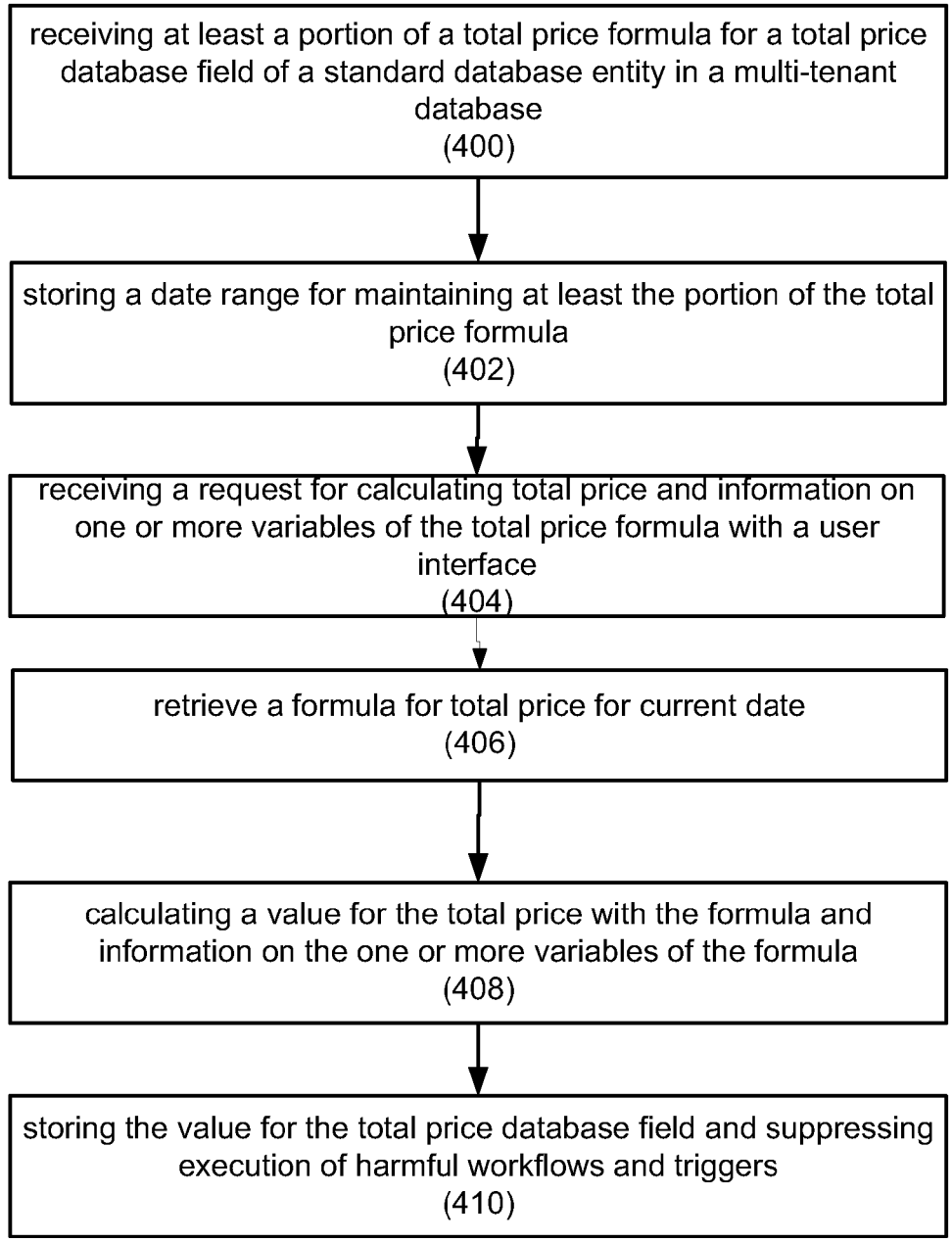
FIG. 4 illustrates an example of a flow diagram for an implementation of customizing standard formula fields in a database system.

FIG. 4 illustrates an example of a flow diagram for an implementation of customizing standard formula fields in a database system. At least a portion of a total price formula for a total price database field of a standard database entity in multi-tenant database may be received (400). The portion of the total price formula may modify a calculation for the discount of a total price standard formula and/or the portion may replace the standard total price formula. In another embodiment, the portion of the total price formula may have a calculation for a currency conversion.

A date range for maintaining at least the portion of the total price formula may be stored (402). The date range may indicate the expiration of a customized or modified formula for the total price. The date range may provide a period of time that the calculation of the total price may be consistently applied for other database entities dependent on the value of the standard database field.

A request for calculating the total price and information on one or more variables of the total price formula may be received with the user interface (404). The user may utilize the user interface to input the variables, including but not limited to, product, quantity, and any other variables relevant to calculating total price. For example, the user may input the information for a new data row of a standard database entity "Opportunity."

A formula may be retrieved for the total price for the current date (406). The modified formula for the total price may be retrieved for the current date. A value may be calculated for the total price with the formula and information on the one or more variables for the formula (408). The value for the total price standard database field may be stored (410). Execution of harmful workflows and/or triggers may be suppressed (410). User defined workflows and triggers may be suppressed to ensure that errors do not occur, such as infinite loops.

In one embodiment, customized discount formulas may be selectively applied to certain opportunity or quote data rows in the CRM system. For example, a user may decide to provide a customized discount formula only to opportunities or quotes that are located in the Western region of the United States. In another embodiment, the CRM system may include the ability to mass update selected existing opportunity and quote line items to conform to a new customized discounting model. In another embodiment, the CRM system may include the ability to assign different customized discounting models to different opportunities or quotes, based on explicit selection, record type association, or some other rule based selection mechanism.

The CRM system may include the ability to change the discount formula on the fly and dynamically apply it to selected opportunities or quotes. For example, the user may be able to input the discount formula using the user interface, and subsequent inputs of opportunities and quotes may dynamically have the new discount formula applied to the values. The CRM system may also include an ability to disable or disallow one or more discounting models in certain situations.

In an embodiment, the steps of: entering opportunity data (associated with sales or pending deals) or quote data into a CRM system; providing the ability for customers or users of the CRM system to create customized pricing or discount formulas for the opportunities or quotes; calculating the total price and revenue forecasts based on the customized pricing or discount formulas; and providing customized opportunity or quote total price or revenue information based on the customized pricing or discount formulas.

Users may provide their own discounting formula for calculating the total price for a quote or opportunity line item and can display all relevant fields on a quote Portable Document Format (PDF) document. An implementation is provided for creating a PDF for a Quote in U.S. patent application Ser. No. 12/985,313, entitled "PROVIDING A QUOTE TEMPLATE IN A MULTI-TENANT DATABASE SYSTEM ENVIRONMENT," filed on Jan. 5, 2011, and issued as U.S. Pat. No. 8,739,030 on May 27, 2014, which is incorporated herein by reference in its entirety. In an embodiment, opportunity and quote line fields may be synchronized, so that the opportunity and the forecast represent the values quoted to the customer.

The standard database field value may be calculated using a given formula and stored in the database row. In an embodiment, the user may change the formula associated with the OpportunityLineItem.TotalPrice database field. When the user provides a custom formula for this field, the standard formula (quote×standard price=total price) may not be used.

System Overview

Figure 5:
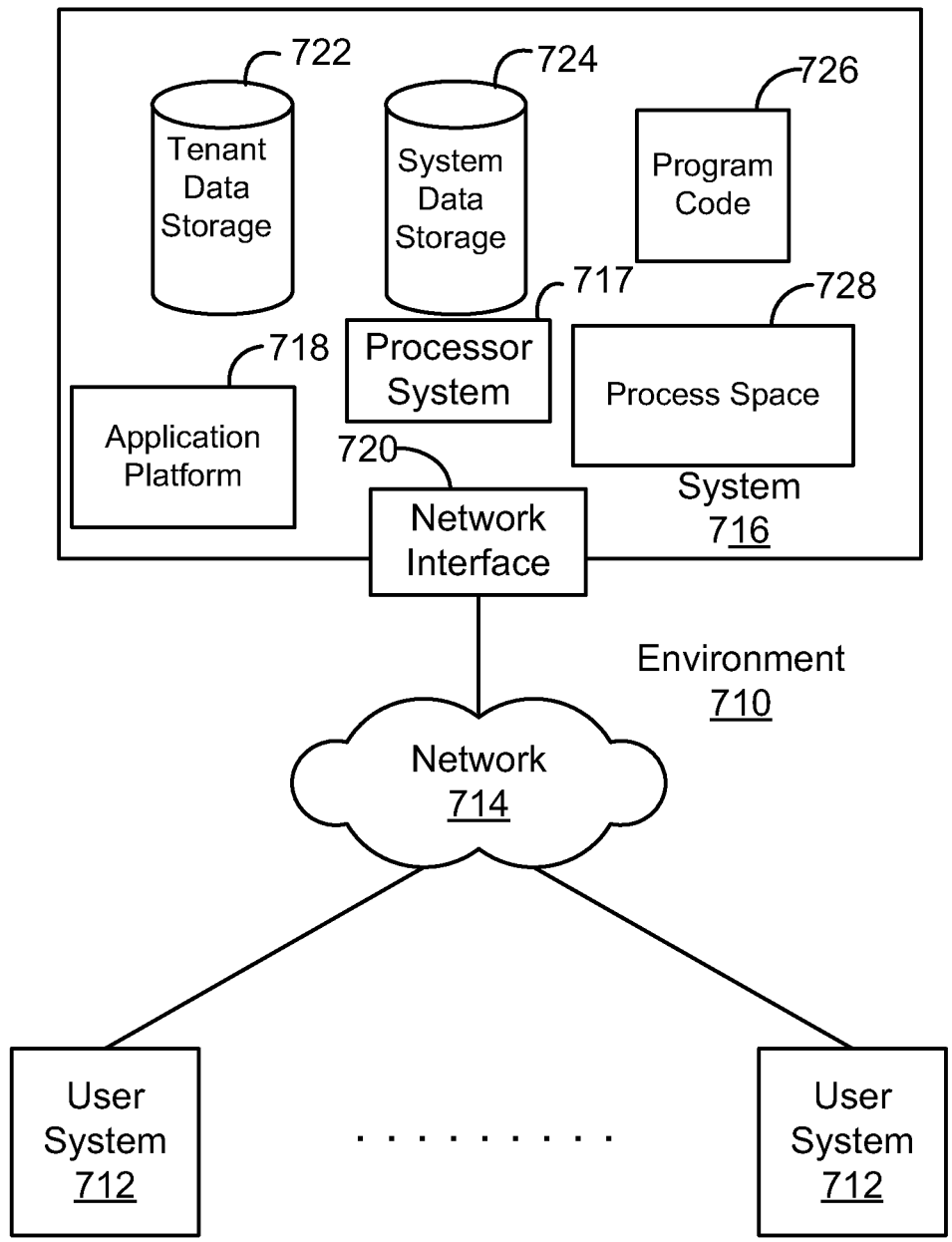
FIG. 5 illustrates a block diagram of an example of an environment wherein an on-demand database service might be used.

FIG. 5 illustrates a block diagram of an environment 710 wherein an on-demand database service might be used. Environment 710 may include user systems 712, network 714, system 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Environment 710 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 5 (and in more detail in FIG. 6) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" will be used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 5, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 5, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 5 include conventional, well-known elements that are explained only briefly here. For example, each user system 712 could include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript™, ActiveX, any other scripting language, such as VBScript, Flex, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
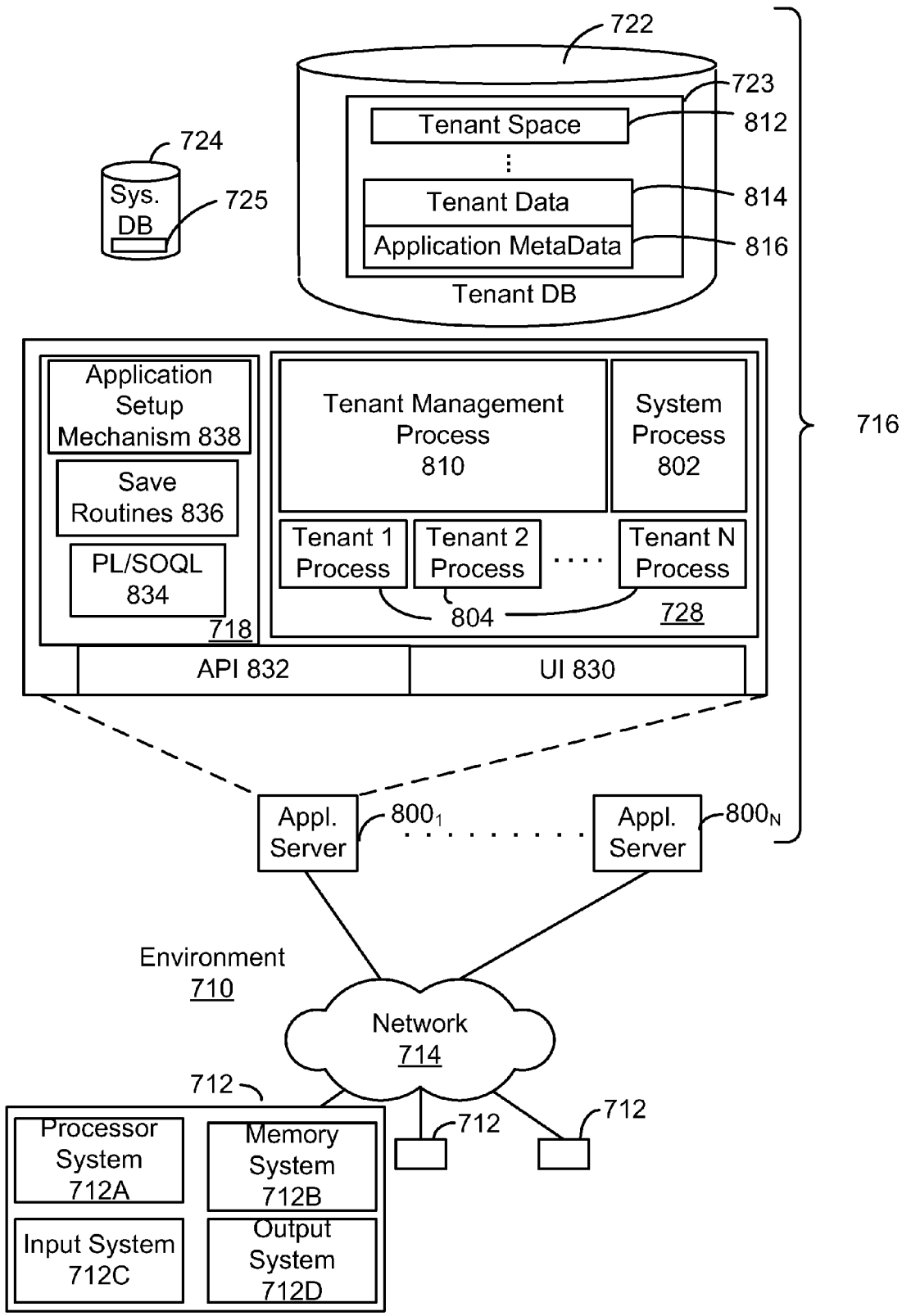
FIG. 6 illustrates a block diagram of an embodiment of elements of FIG. 5 and various possible interconnections between these elements.

FIG. 6 also illustrates environment 710. However, in FIG. 6 elements of system 716 and various interconnections in an embodiment are further illustrated. FIG. 6 shows that user system 712 may include processor system 712A, memory system 712B, input system 712C, and output system 712D. FIG. 6 shows network 714 and system 716. FIG. 6 also shows that system 716 may include tenant data storage 722, tenant data 723, system data storage 724, system data 725, User Interface (UI) 830, Application Program Interface (API) 832, PL/SOQL 834, save routines 836, application setup mechanism 838, applications servers 800₁-800N, system process space 802, tenant process spaces 804, tenant management process space 810, tenant storage area 812, user storage 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above in FIG. 5. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks. As shown by FIG. 6, system 716 may include a network interface 720 (of FIG. 5) implemented as a set of HTTP application servers 800, an application platform 718, tenant data storage 722, and system data storage 724. Also shown is system process space 802, including individual tenant process spaces 804 and a tenant management process space 810. Each application server 800 may be configured to tenant data storage 722 and the tenant data 723 therein, and system data storage 724 and the system data 725 therein to serve requests of user systems 712. The tenant data 723 might be divided into individual tenant storage areas 812, which can be either a physical arrangement and/or a logical arrangement of data. Within each tenant storage area 812, user storage 814 and application metadata 816 might be similarly allocated for each user. For example, a copy of a user's most recently used (MRU) items might be stored to user storage 814. Similarly, a copy of MRU items for an entire organization that is a tenant might be stored to tenant storage area 812. A UI 830 provides a user interface and an API 832 provides an application programmer interface to system 716 resident processes to users and/or developers at user systems 712. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PL/SOQL 834 that provides a programming language style interface extension to API 832. Invocations to applications may be detected by one or more system processes, which manages retrieving application metadata 816 for the subscriber making the invocation and executing the metadata as an application in a virtual machine.

Each application server 800 may be communicably coupled to database systems, e.g., having access to system data 725 and tenant data 723, via a different network connection. For example, one application server 800₁ might be coupled via the network 714 (e.g., the Internet), another application server 800N-1 might be coupled via a direct network link, and another application server 800N might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 712 to distribute requests to the application servers 800. In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, system 716 is multi-tenant, wherein system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 700 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for customizing standard formula fields in a database system, the method comprising:
   receiving at least a portion of a formula for a standard database field of a standard database entity in a database system;
   storing a date range for maintaining at least the portion of the formula;
   calculating a value for the standard database field with at least the portion of the formula and information on one or more variables of the formula, wherein one or more database entities depend on the value for the standard database field; and
   storing the value for the standard database field.

2. The method of claim 1, wherein at least the portion of the formula is a formula for a variable for a total price value in a customer relationship management database entity.

3. The method of claim 1, further comprising:
   retrieving a formula for the standard database field valid for a current date.

4. The method of claim 1, further comprising:
   suppressing execution of at least a portion of user defined code, where the portion of user defined code produces unexpected results with the value calculated for the standard database field.

5. The method of claim 1, further comprising:
   storing the value after executing user defined code for the standard database field.

6. The method of claim 1, wherein a database entity that depends on the value for the standard database field is a forecasting database entity.

7. The method of claim 1, wherein at least the portion of the formula is a formula for a total price value in a customer relationship management database entity.

8. A computer-readable storage medium having one or more instructions thereon for customizing formula fields in a database system, the instructions when executed by one or more processors causing the one or more processors to implement a method comprising:
   receiving at least a portion of a formula for a database field of a database entity in a database system;
   storing a date range for maintaining at least the portion of the formula;
   calculating a value for the database field with at least the portion of the formula and information on one or more variables of the formula, wherein one or more database entities depend on the value for the database field; and
   storing the value for the database field.

9. The computer-readable storage medium of claim 8, wherein at least the portion of the formula is a formula for a variable for a total price value in a customer relationship management database entity.

10. The computer-readable storage medium of claim 8, wherein the method implemented by the instructions further comprises:
    retrieving a formula for the database field valid for a current date.

11. The computer-readable storage medium of claim 8, wherein the method implemented by the instructions further comprises:
    suppressing execution of at least a portion of user defined code, where the portion of user defined code produces unexpected results with the value calculated for the database field.

12. The computer-readable storage medium of claim 8, wherein the method implemented by the instructions further comprises:
    storing the value after executing user defined code for the database field.

13. The computer-readable storage medium of claim 8, wherein a database entity that depends on the value for the database field is a forecasting database entity.

14. The computer-readable storage medium of claim 8, wherein at least the portion of the formula is a formula for a total price value in a customer relationship management database entity.

15. A computer-based system for customizing standard formula fields in a tenant database system, the computer-based system comprising:
    a processor; and
    one or more stored sequences of instructions which, when executed by the processor, cause the processor to implement a method comprising:
       receiving at least a portion of a formula for a standard database field of a standard database entity in a database;
       storing a date range for maintaining at least the portion of the formula;
       calculating a value for the standard database field with at least the portion of the formula and information on one or more variables of the formula, wherein one or more database entities depend on the value for the standard database field; and
       storing the value for the standard database field.

16. The system of claim 15, wherein at least the portion of the formula is a formula for a variable for a total price value in a customer relationship management database entity.

17. The system of claim 15, wherein the method implemented by the instructions further comprises:
    retrieving a formula for the standard database field valid for a current date.

18. The system of claim 15, wherein the method implemented by the instructions further comprises:
    suppressing execution of at least a portion of user defined code, where the portion of user defined code produces unexpected results with the value calculated for the standard database field.

19. The system of claim 15, wherein the method implemented by the instructions further comprises:
    storing the value after executing user defined code for the standard database field.

20. The system of claim 15, wherein a database entity that depends on the value for the standard database field is a forecasting database entity.

* * * * *